(12) United States Patent
Gravely, III et al.

(10) Patent No.: US 12,250,935 B2
(45) Date of Patent: Mar. 18, 2025

(54) TELESCOPING OUTRIGGER ARM

(71) Applicant: GEM Products, LLC, Jacksonville, FL (US)

(72) Inventors: William Ashford Gravely, III, Jacksonville, FL (US); Nicholas George Vanderlinde, Ponte Vedra, FL (US)

(73) Assignee: GEM Products, LLC, Jacksonville, FL (US)

( * ) Notice: Subject to any disclaimer, the term of this patent is extended or adjusted under 35 U.S.C. 154(b) by 165 days.

(21) Appl. No.: 17/903,748

(22) Filed: Sep. 6, 2022

(65) Prior Publication Data

US 2024/0074420 A1    Mar. 7, 2024

(51) Int. Cl.
*A01K 91/08* (2006.01)
*A01K 97/10* (2006.01)
*F16B 7/10* (2006.01)

(52) U.S. Cl.
CPC .............. *A01K 91/08* (2013.01); *A01K 97/10* (2013.01); *F16B 7/10* (2013.01)

(58) Field of Classification Search
CPC ............ A01K 91/08; A01K 97/10; F16B 7/10
See application file for complete search history.

(56) References Cited

U.S. PATENT DOCUMENTS

| | | | | |
|---|---|---|---|---|
| 5,245,780 A | * | 9/1993 | Hansen | F16M 11/2078 248/654 |
| 8,683,735 B1 | * | 4/2014 | Figari | A01K 91/08 43/26.1 |

* cited by examiner

*Primary Examiner* — Kimberly T Wood
(74) *Attorney, Agent, or Firm* — Taft Stettinius & Hollister LLP

(57) ABSTRACT

A fishing outrigger including a telescoping outrigger assembly is provided. The outrigger assembly may include a cantilever spring assembly, at least two telescoping tubes, a central spring, a stabilizer base and pole, and at least one mounting body. The cantilever spring assembly may be adapted to lock the extended telescoping tubes securely in place and allow for easy retraction. The cantilever spring assembly may be coupled to the stabilizer base, both of which may ride along the outside of a telescoping tube. Mounting assemblies may be disposed at the ends of the outrigger assembly and be adapted to secure the outrigger assembly to a boat or other vehicle.

19 Claims, 17 Drawing Sheets

TELESCOPING OUTRIGGER ARM

TECHNICAL FIELD OF THE INVENTION

The present invention relates generally to fishing outriggers, and more particularly to an outrigger assembly with a telescoping layout arm and a cantilever spring lock.

BACKGROUND OF THE INVENTION

Outriggers are popular in ocean fishing applications. Outriggers are rigid poles that are a part of the boats rigging and are designed to extend the fishing pole bait lines beyond the "whitewash" of the water surrounding the boat. This is preferable because bait traveling through clear water outside of the "whitewash" is more likely to successfully attract fish to the bait. Once a fish takes the bait, the line may be automatically released from the outrigger and all forces are transferred directly to a corresponding fishing pole secured to the gunwale of the boat. For example, the bait line can be connected to a quick release mechanism that releases the line and transfers the forces to the pole when a fish engages the bait or otherwise pulls on the line.

Outriggers typically include several interconnectable, telescopic, or extensible tubes connected to one another by an interconnection device, such as clamps, adhesives, rivets, fasteners, or the like. For sport fishing outriggers of the "layout" design, the upper tubular member is required to shorten or lengthen to control the position of the outrigger assembly between stowed and deployed positions. Traditionally, this is done with either a hydraulic ram or a folding two-tube assembly that does not telescope.

The upper tubular member of the outriggers, referred to as the "layout arm," must be able to hold the outrigger firmly when in the deployed position. Traditionally, this is mechanically achieved by using a two-tube folding assembly having a joint that extends beyond 180 degrees that must be manually unlocked to allow it to fold back into the stowed position. While this traditional configuration is simple and effective, it precludes the layout arm from telescoping.

SUMMARY OF THE INVENTION

The present invention broadly comprises a fishing outrigger including a telescoping outrigger assembly. The outrigger assembly may include a cantilever spring assembly, at least two telescoping tubes, a central bias member, a stabilizer base and pole, and at least one mounting body. In an embodiment, the cantilever spring assembly may be adapted to lock the extended telescoping tubes securely in place and allow for easy retraction. The cantilever spring assembly may be coupled to the stabilizer base, both of which may ride along the outside of a telescoping tube. Mounting assemblies may be disposed at the ends of the outrigger assembly and be adapted to secure the outrigger assembly to a boat or other vehicle.

According to an embodiment, a telescoping arm assembly is described. The assembly may include first and second tubes in telescopic sliding engagement. The first tube may have an external diameter greater than an external diameter of the second tube. An endcap may be coupled to the second tube. A cantilever spring assembly may be coupled to the endcap on an inward bias towards a central axis of the first and second tube. The cantilever spring assembly may also define a first axial passthrough. The spring ring may be slidingly coupled to the first tube through the first axial passthrough. A stabilizer base may define a second axial passthrough. The stabilizer base may also be slidingly coupled to the first and second tubes through the second axial passthrough. The inward bias of the cantilever spring assembly may bias the spring ring laterally towards the central axis as the spring ring axially slides over a top surface of the first tube.

According to another embodiment, a telescoping outrigger may comprise first and second tubes in telescopic sliding engagement. The first tube may have an internal diameter substantially equal to the external diameter of the second tube. A first mounting body may be coupled to the first tube and a second mounting body may be coupled to the second tube. An endcap may be coupled to the second tube and second mounting body. A cantilever spring assembly may be coupled to the endcap on an inward bias towards a central axis of the first and second tube. The cantilever spring assembly may define a first axial passthrough. The spring ring may be slidingly coupled to the first tube and second tube through the first axial passthrough. A stabilizer base may define a second axial passthrough and be coupled to the cantilever spring assembly. The first and second telescoping tubes may be coupled to the stabilizer base through the second axial passthrough. A stabilizer tube may be coupled to the end cap and the stabilizer base. An internal bias member may be coupled to the first and second mounting bodies and disposed within the first and second tubes. The inward bias of the cantilever spring assembly may bias the spring ring laterally towards the central axis as the spring ring axially slides over a top surface of the first tube, engaging a bottom surface of the spring ring with the top surface of the first tube.

According to another embodiment, a cantilever locking mechanism is described. The cantilever locking mechanism may include a stanchion, a base coupled to the stanchion and a spring ring coupled to the base. The spring ring may define a first axial passthrough. A stabilizer base may be coupled to the spring ring and define a second axial passthrough coaxial to the first passthrough. A first telescoping tube and a second telescoping tube may be in sliding engagement and disposed through the first and second axial passthroughs. The first telescoping tube may have an internal diameter substantially equal to the external diameter of the second telescoping tube. The spring ring may be biased inwardly towards a central axis of the first and second telescoping tubes such that sliding the spring ring over a top surface of the first telescoping tube engages a bottom surface of the spring ring with a top surface of the first telescoping tube.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1A:
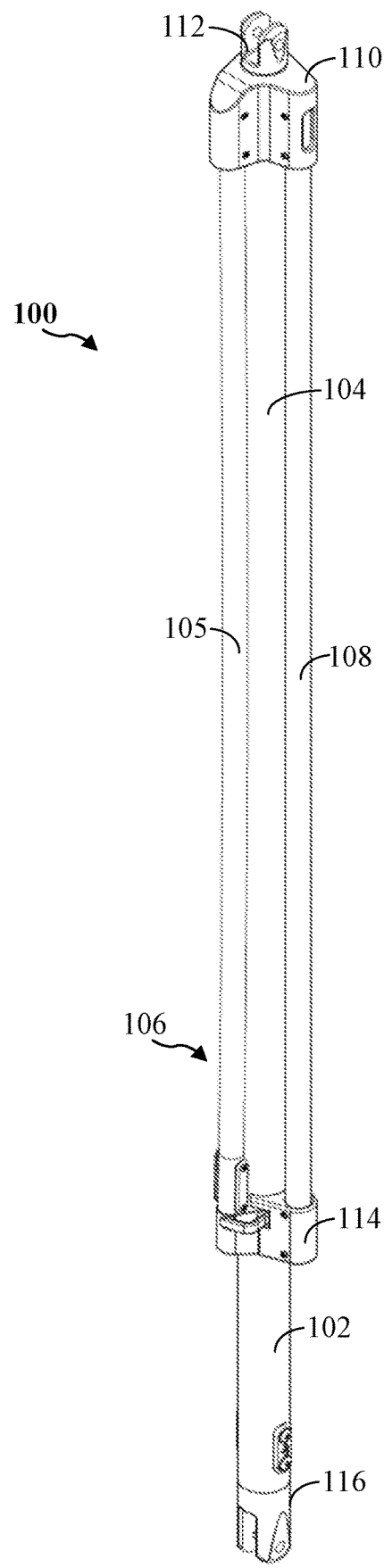
FIG. 1A is a perspective view of an exemplar outrigger assembly in a retracted position, according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to a telescoping outrigger assembly adapted for use on a fishing boat or vessel. According to embodiments of the invention, the telescoping outrigger assemblies described herein provide several advantageous features. For example, and without limitation, telescoping poles may be capable of housing additional elements, such as long internal springs, that may help the user retrieve the outrigger more easily by counteracting the weight of the outrigger. Furthermore, telescoping poles may provide motion damping in the form of pneumatic seals. Telescoping poles may also include stops that prevent over-extension.

Referring to FIGS. 1A-4D, an embodiment of an outrigger assembly 100, including a first telescoping tube 102, a second telescoping tube 104, a cantilever spring assembly 106, a stabilizer tube 108, an endcap assembly 110, a stabilizer base 114, a distal mounting body 112 and a proximal mounting body 116 is shown. The outrigger assembly 100, in use, may be coupled to a boat, vessel, or other vehicle, by coupling the proximal mounting body 116 to an outrigger support (not shown) or other structure rigidly coupled to the boat. The supports may be coupled to the hull of the boat or other suitable structure on the boat, such as, for example, pipework or a rigid canopy and allow the outrigger assembly to rotate between a stowed and deployed position. The distal mounting body 112 may be used to couple additional rigging or equipment to the end of the outrigger assembly 100 or to secure it when stowed. An alternative embodiment may include an installation in which the depicted proximal and distal ends are swapped so that the distal mounting body 112 is coupled to an outrigger support or other structure rigidly couple to the boat, and the proximal mounting body 116 coupled to the end of the outrigger assembly.

Figure 1B:
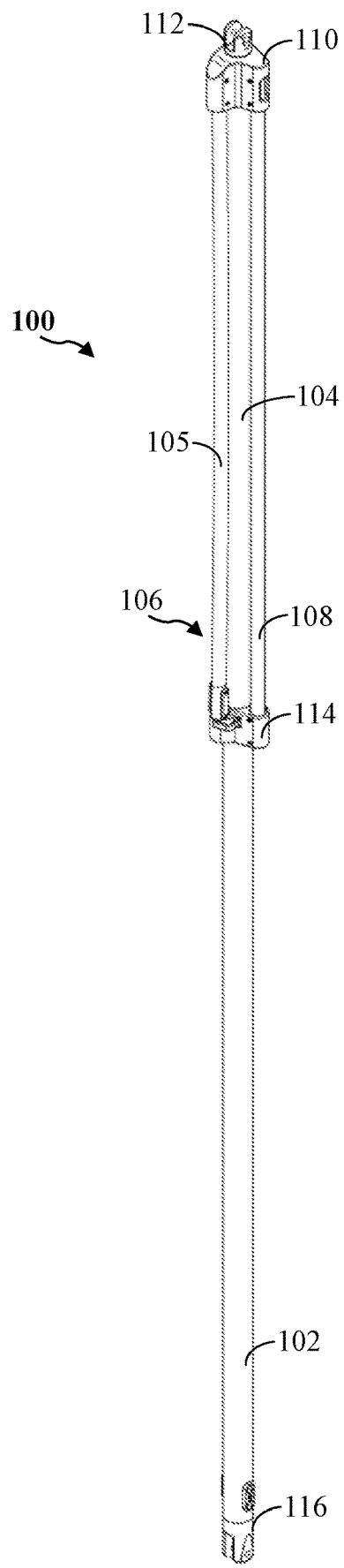
FIG. 1B is a perspective view of an exemplar outrigger assembly in an extended position, according to an embodiment of the present invention.
Figure 5:
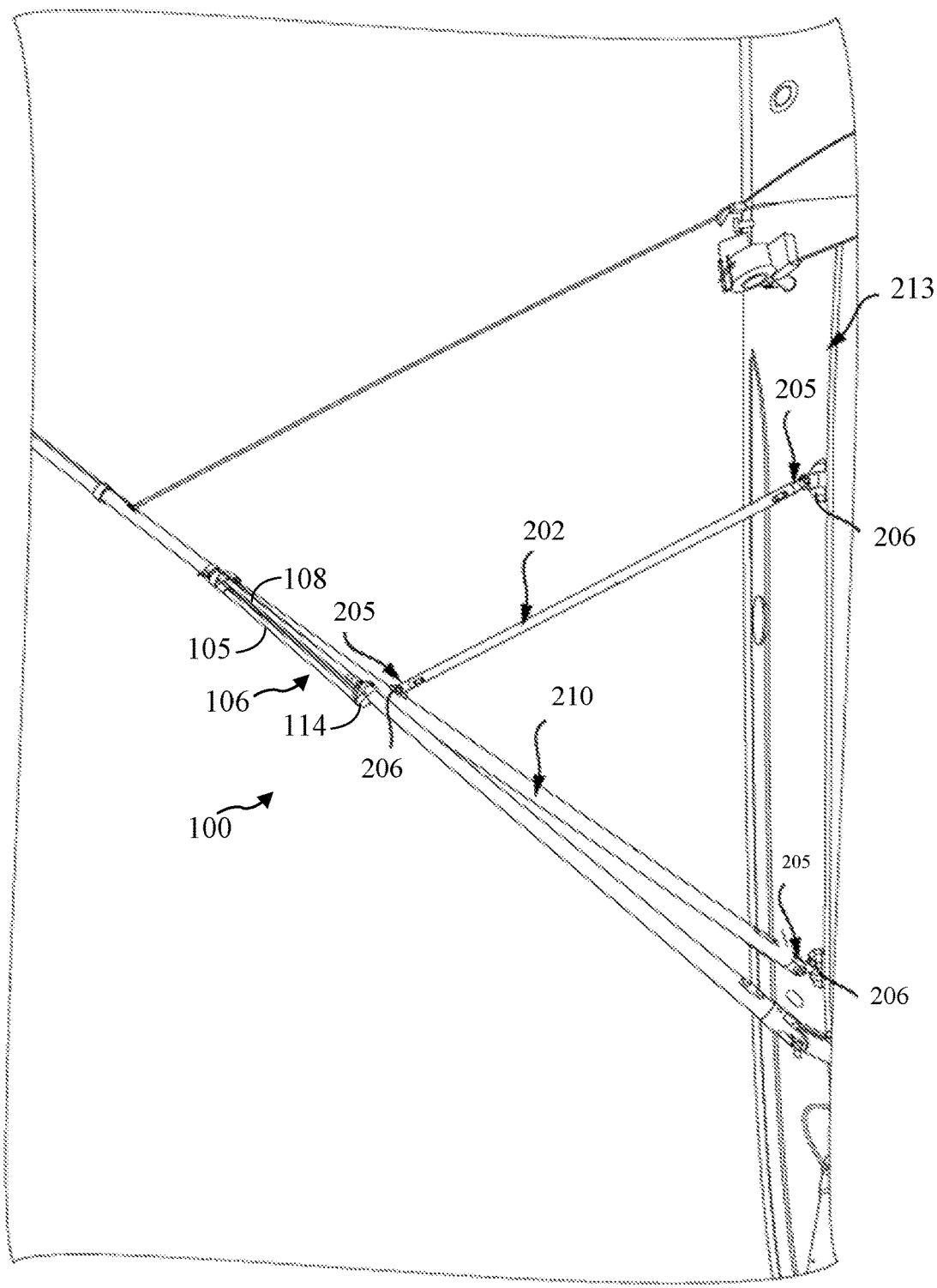
FIG. 5 is a perspective view of the mounting assembly of FIG. 1 in use to mount an outrigger assembly to a boat.

FIG. 1A, according to an embodiment, depicts the outrigger assembly 100 in a collapsed or retracted position. When the outrigger assembly 100 is not in use, it may be retracted and stowed in a stowed position that does not interfere with the operation of the boat. When in use, the outrigger assembly 100 may be extended, as shown in FIG. 1B and FIG. 5. As shown in FIG. 5 the outrigger assembly 100 may be coupled to one or more support tubes 202. The mounting points 206 may be disposed on one or more of a vehicle, such as, a hull or other structure, such as pipework and/or canopy, of a boat 213, an outrigger tube 210, and the outrigger assembly 100. As illustrated, the mounting bodies 205 may be disposed on both opposing ends of the support tube 202, such that one end is pivotably coupled to the outrigger tube 210 and the other end is pivotably coupled to the vehicle via the mounting points 206.

Referring to FIG. 1B, according to an embodiment, the outrigger assembly 100 includes a first telescoping tube 102 and a second telescoping tube 104. In operation, and as described herein, the outrigger assembly 100 may be extended by applying an outward axial force (away from the proximal mounting body 116) on the second telescoping tube 104 causing the cantilever spring assembly 106, stabilizer tube 108, stabilizer base 114, distal mounting body 112, and endcap assembly 110 to travel along the first telescoping tube 102 into an extended position. The first telescoping tube 102 and the second telescoping tube 104 may be allowed to freely rotate axially preventing any potential binding of the hardware mounting the outrigger assembly 100 to the boat. The telescoping tubes may be made from any number of materials common to known outrigging devices, including metals, metal alloys, carbon-fiber, or the like.

According to an embodiment, and as described below, the cantilever spring assembly 106 may be adapted to lock the position of the second telescoping tube 104 in relation to the first telescoping tube 102. To retract the outrigger assembly 100, an inward axial force may be applied (towards the proximal mounting body 116) causing the narrower second telescoping tube 104 to slide into the first telescoping tube 102. The cantilever spring assembly 106 may resist inward axial force and prevent telescoping of the second telescoping tube 104 and the first telescoping tube 102 when in the locked position. The cantilever spring assembly 106 may also automatically lock and remain locked unless and until the cantilever spring assembly 106 is acted on to unlock. In an embodiment of the present invention, the outrigger assembly may rigidly and reliably lock in the extended position to support the outrigger mechanism when in the deployed position. According to an embodiment, an internal bias member (124, FIG. 2B), or other spring-like device, may be disposed within the first telescoping tube 102 and second telescoping tube 104. As described below, the internal bias member 124 may be of sufficient length and negative bias to aid in the retraction of the second telescoping tube 104 into the first telescoping tube 102, bringing the outrigger assembly 100 into a retracted position (FIG. 1A). The internal bias member 124 may reduce the amount of work required to retrieve or retract the extended second telescoping tube 104.

The second telescoping tube 104 may have a smaller external diameter than the first telescoping tube 102, allowing the second telescoping tube 104 to slide into, or travel through, the first telescoping tube 102. According to another embodiment, the external diameter of the second telescoping tube 104 is substantially equal to or fractionally smaller than the internal diameter of the first telescoping tube 102, such that the sliding engagement of the tubes forms a pneumatic seal inside the tubes. The pneumatic seal formed by the friction-fit engagement of the first telescoping tube 102 and the second telescoping tube 104 and the resulting pressure within the tubes may affect the motion and force required to extend and retract the outrigger assembly 100.

Figure 2A:
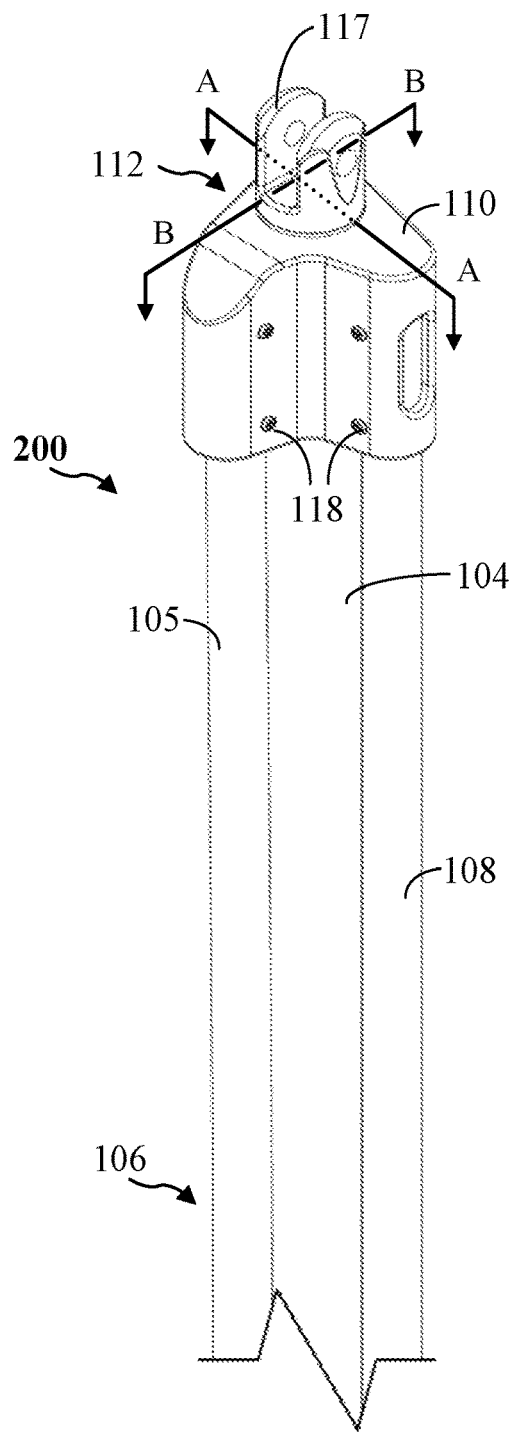
FIG. 2A is a perspective view of a distal end of the outrigger assembly of FIGS. 1A-1B, according to an embodiment of the present invention.
Figure 2B:
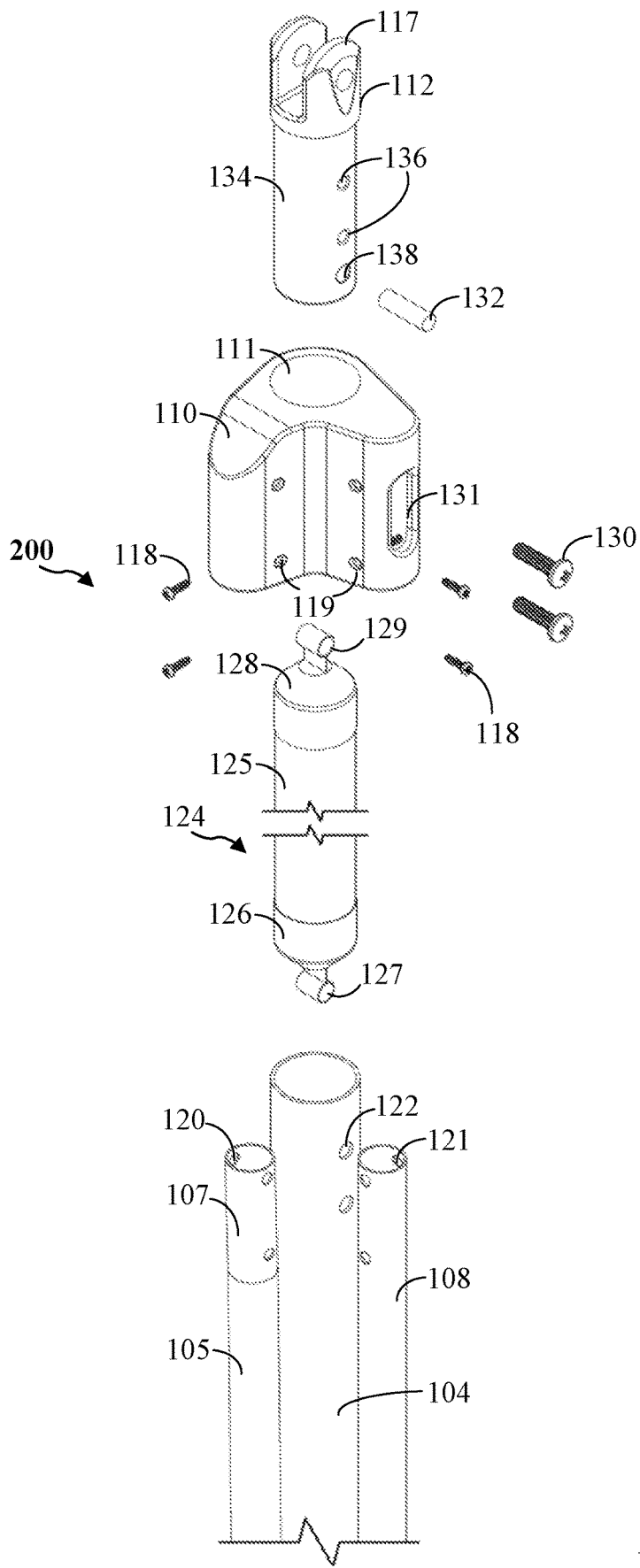
FIG. 2B is a front-exploded view of the distal end of the outrigger assembly in FIG. 2A, according to an embodiment of the present invention.
Figure 2C:
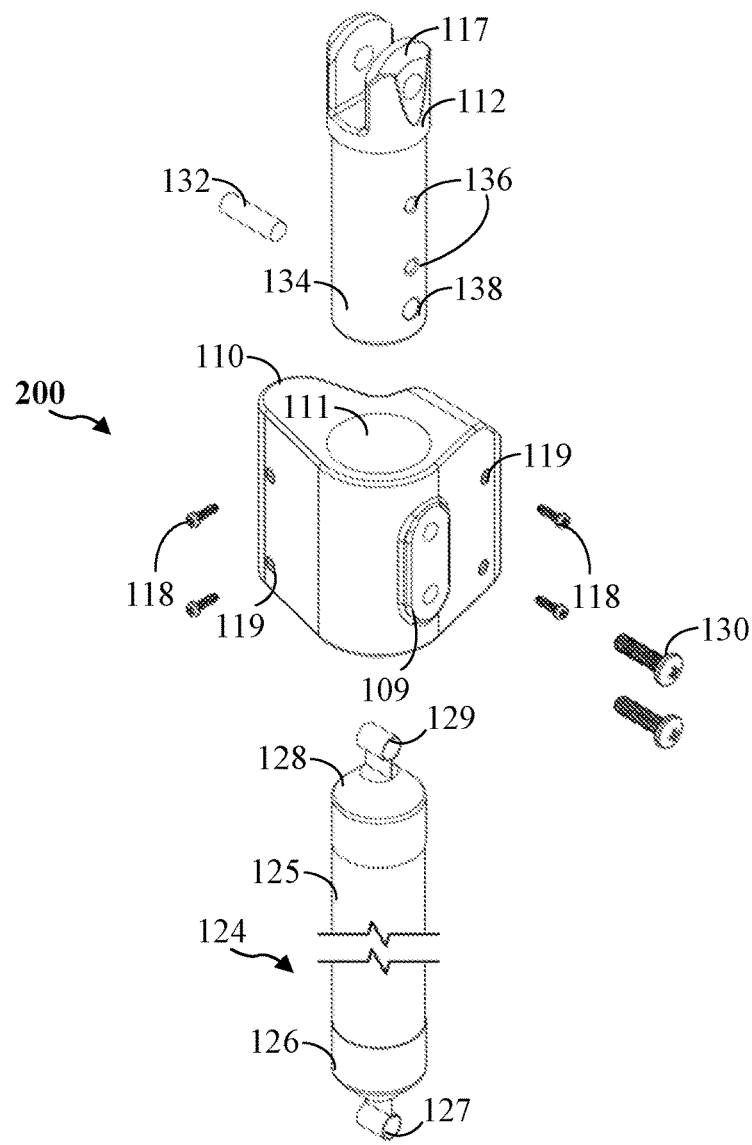
FIG. 2C is a rear-exploded view of the distal end of the outrigger assembly in FIG. 2A, according to an embodiment of the present invention.
Figure 2D:
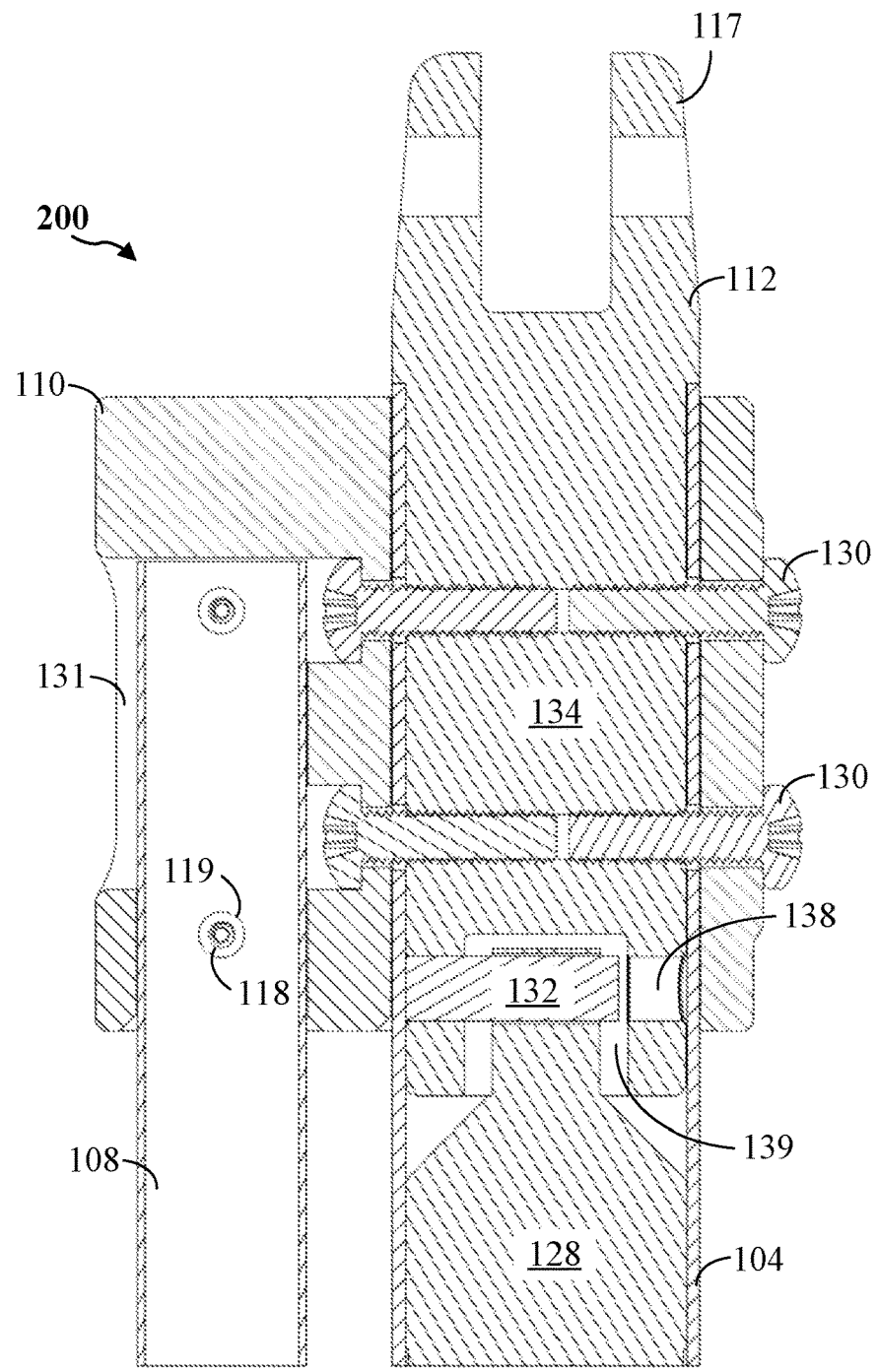
FIG. 2D is a sectional view of the distal end of the outrigger assembly in FIG. 2A, taken along line A-A of FIG. 2A, according to an embodiment of the present invention.
Figure 2E:
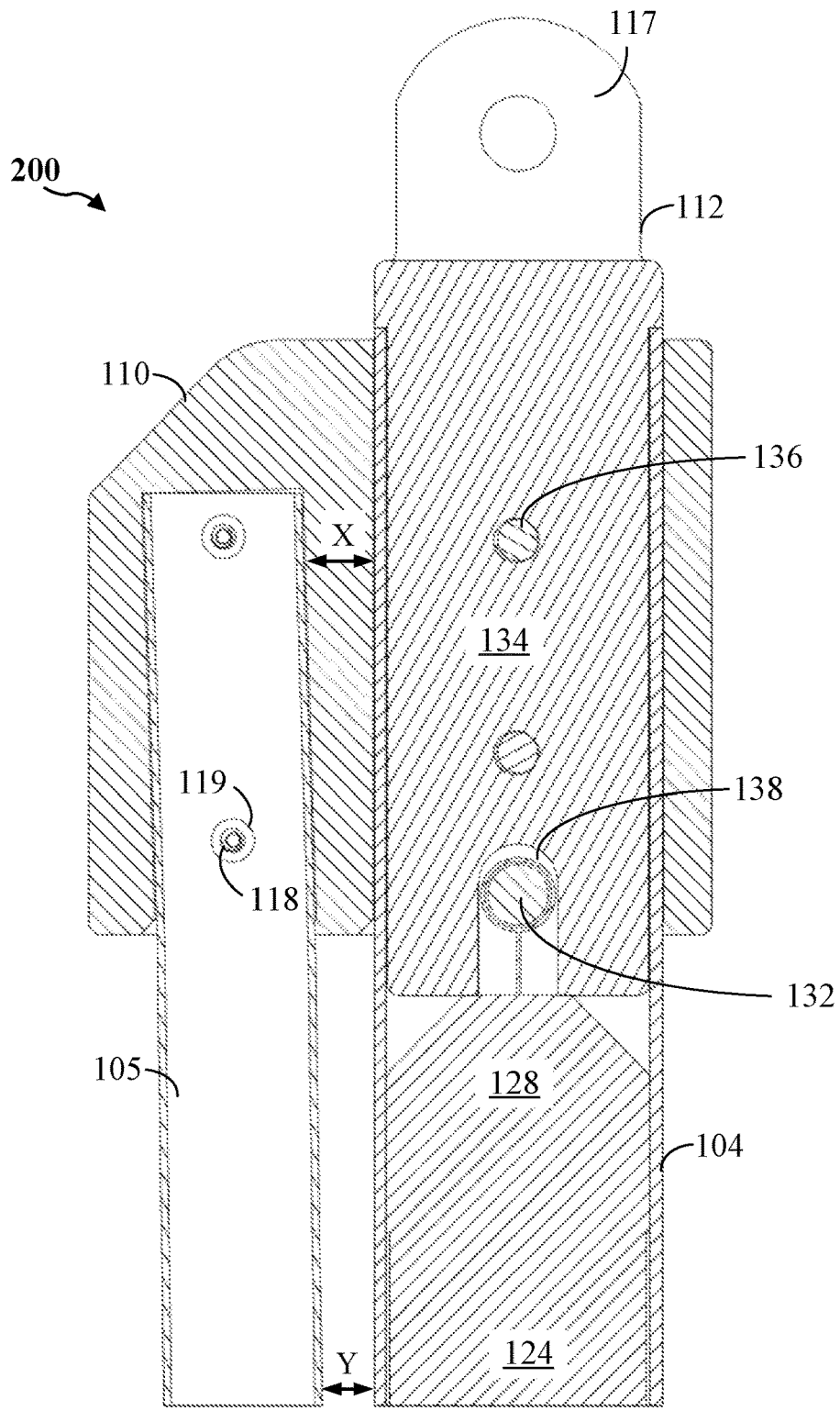
FIG. 2E is a sectional view of the distal end of the outrigger assembly in FIG. 2A, taken along line B-B of FIG. 2A, according to an embodiment of the present invention.

Referring to FIGS. 2A-2E, a distal end 200 of the outrigger assembly 100 is depicted in various views. FIGS. 2B and 2C depict opposing views, respectively, of an exploded view of one embodiment of the distal end 200 of the outrigger assembly 100. FIG. 2D depicts a section view of the distal end 200, taken along line A-A of FIG. 2A. FIG. 2E depicts a section view of the distal end 200, taken along the line B-B of FIG. 2A. As shown in FIG. 2A, the distal end 200 may include an endcap assembly 110 to which the second telescoping tube 104, the cantilever spring assembly 106, the stabilizer tube 108, and the distal mounting body 112 are fixedly coupled.

Referring to FIGS. 2B-2E, the second telescoping tube 104 may define one or more voids 122 for receiving a fastener, for example a pair of screws 130, adapted to secure the second telescoping tube 104 to the endcap assembly 110. The cantilever spring assembly 106 may include a stanchion 105. In one embodiment, the stanchion 105 may include or define a reduced-diameter end 107. The reduced-diameter end 107 may define one or more voids 120 for receiving a fastener, for example a pair of screws 118, adapted to secure the reduced diameter end 107 of the stanchion 105 to the endcap assembly 110. Similarly, the stabilizer tube 108 may define one or more voids 121 for receiving a fastener, for example a pair of screws 118, adapted to secure the stabilizer tube 108 to the endcap assembly 110. In a pre-installed, unstressed state, stanchion 105 may be a straight tube similar to support tube 108, with the difference being stanchion 105 may be installed in a way that such that it remains in bending tension and acts as a preloaded cantilever spring. Support tube 108 may be installed in an unstressed, undeflected state.

The distal mounting body 112 may be or include a clevis portion 117 to receive a pin, bolt, dowel, or other fastener adapted to couple the mounting body 112 to additional rigging, equipment, or the vessel itself. As seen in FIGS. 2D-2E, according to an embodiment, the distal mounting body 112 may include or define a reduced-diameter portion 134 adapted to fit within the second telescoping tube 104 while the clevis portion 117, having a larger diameter, is disposed on or about the top-edge surface of the second telescoping tube 104. The reduced-diameter portion 134 of the distal mounting body 112 may define one or more voids 136 for receiving a fastener, for example the pair of screws 130, adapted to secure the second telescoping tube 104 and the distal mounting body 112 to the endcap assembly 110. The distal mounting body 112 may further define another void 138 for receiving a retaining pin 132 and a distal end 128 of the internal bias member 124. The retaining pin 132 may be adapted to secure the internal biasing member 124 to the distal mounting body 112 and endcap assembly 110, as shown in FIG. 2D.

The endcap assembly 110, according to an embodiment, may define a void 111 sized to receive the second telescoping tube 104 as well as additional voids (not shown) adapted to receive the reduced-diameter end 107 of the cantilever spring assembly 106 and the stabilizer tube 108. The respective voids defined in the endcap assembly 110 may be sized fractionally larger that the diameters of the tubes each void receives. The close-fit sizing of the tubes, and additional fasteners, such as the screws 118, 130, provide for a secure fit minimizing any undesirable movement of the tubes within the endcap assembly 110. The endcap assembly 110 may also define one or more voids 119 for receiving the screws 118 adapted to secure the cantilever spring assembly 106 and the stabilizer tube 108 to the endcap assembly 110. The endcap assembly 110 may further define an access opening 131 through which screws 130 pass when securing the screws 130 to one side of the second telescoping tube 104, the distal mounting body 112, and the endcap assembly 110. The endcap assembly 110 may also include a plate 109 (FIG. 2C) on the outer surface of the assembly to receive screws 130 adapted to secure an opposite side of the second telescoping tube 104, the distal mounting body 112, and the endcap assembly 110.

The internal bias member 124 may further include a proximal end 128 to be coupled to the proximal mounting body 116, as described below. The distal end 128 and proximal end 126 of the internal bias member, according to an embodiment, may each include or define coupling rings 129, 127, respectively. The coupling rings may be adapted to receive the retaining pin 132 coupling the internal bias member 124 to the mounting bodies 114, 112. According to an embodiment, the internal bias member 124 may include one or more non-metallic, e.g., rubber, springs with a surrounding sheath 125 that also acts as a positive stop to limit any potential over-travel of the spring. According to an embodiment, using multiple springs coupled in series allows the spring rate at various parts of the outrigger's travel to be controlled. For example, as the outrigger assembly 100 is deployed outwardly, the effective weight of the outrigger assembly 100 may increase as the angle approaches horizontal and the telescoping movement tends to accelerate towards the deployed position faster. Using a first spring having a first spring rate (such as a short, high spring rate spring) coupled in series with a second spring having a second spring rate less than the first spring rate (such as a long, lower rate spring) may increase the spring rate at the extended end of the travel because the long spring may reach its full length stop and become a rigid cord, which then causes the spring assembly to suddenly increase in spring rate as the short, higher-rate spring is stretched.

Figure 3A:
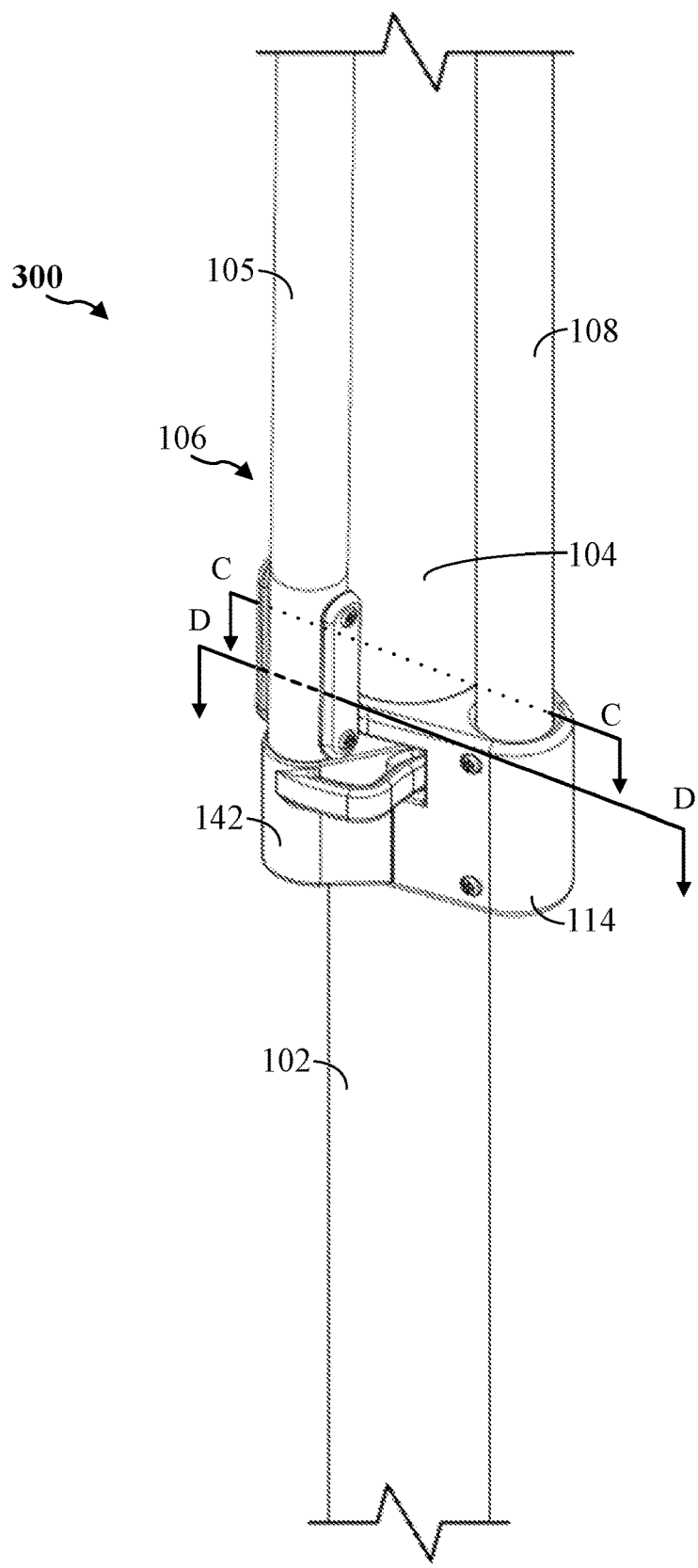
FIG. 3A is a perspective view of a middle section of the outrigger assembly of FIGS. 1A-1B, according to an embodiment of the present invention.
Figure 3B:
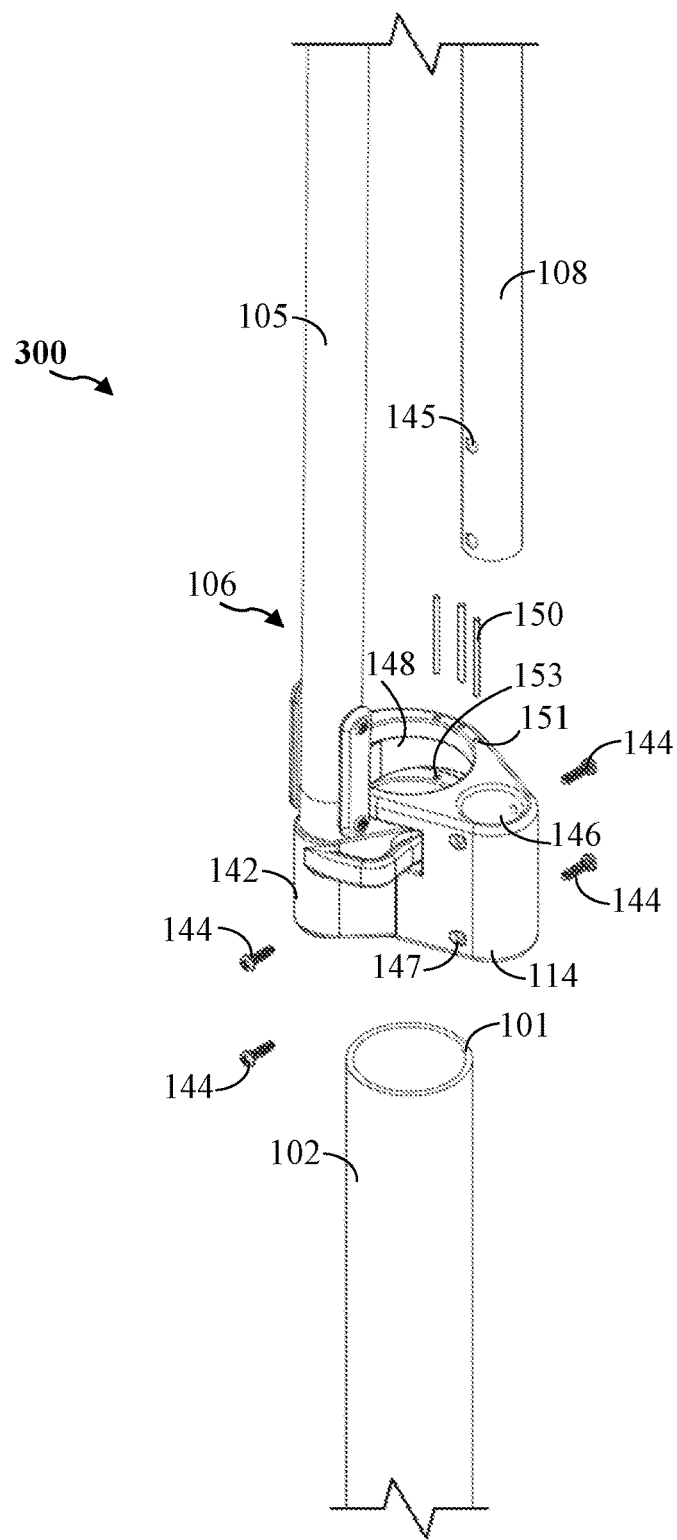
FIG. 3B is an exploded view of a stabilizer base of the outrigger assembly in FIG. 3A, according to an embodiment of the present invention.
Figure 3C:
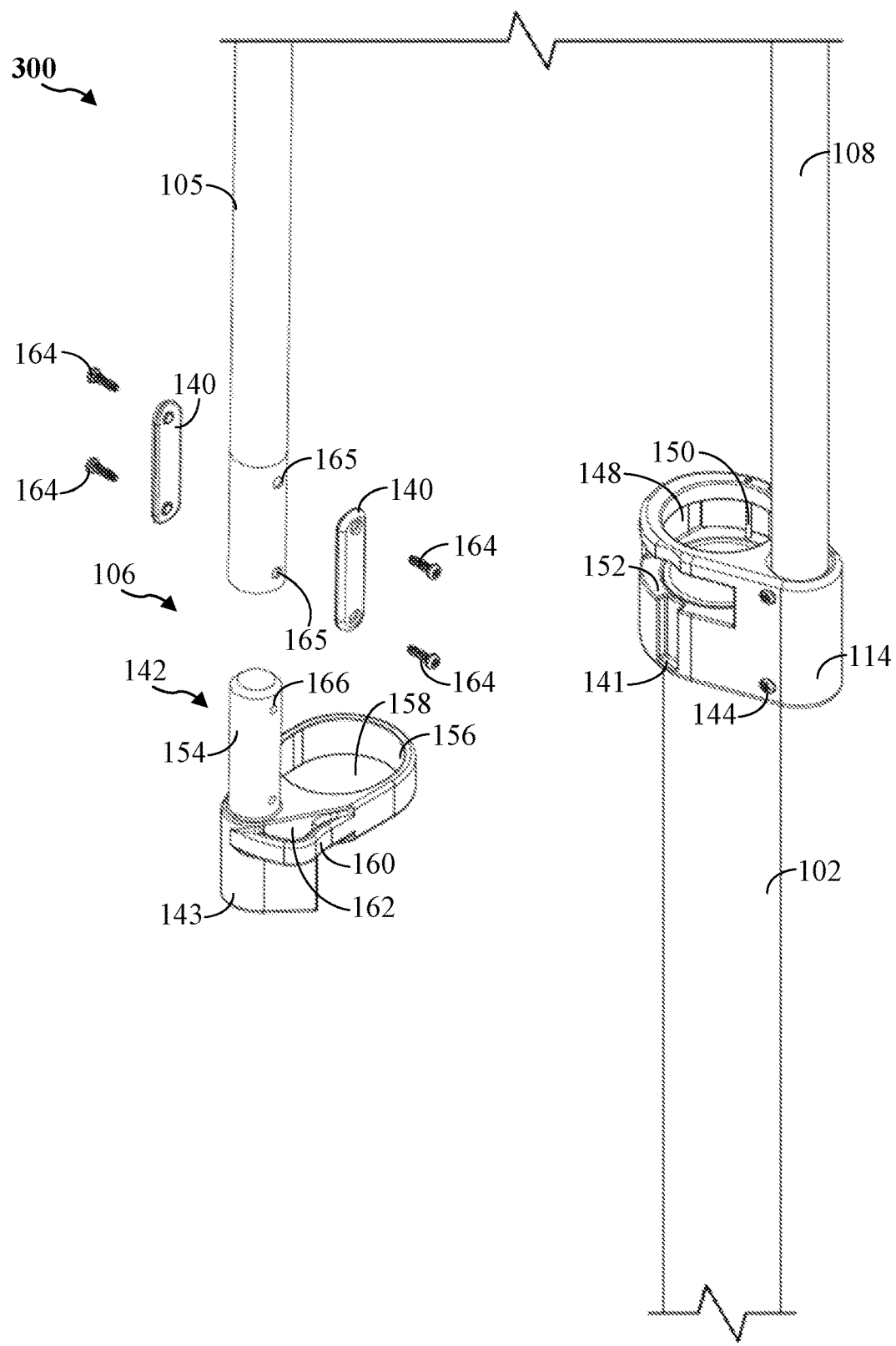
FIG. 3C is an exploded view of a cantilever base of the outrigger assembly in FIG. 3A, according to an embodiment of the present invention.
Figure 3D:
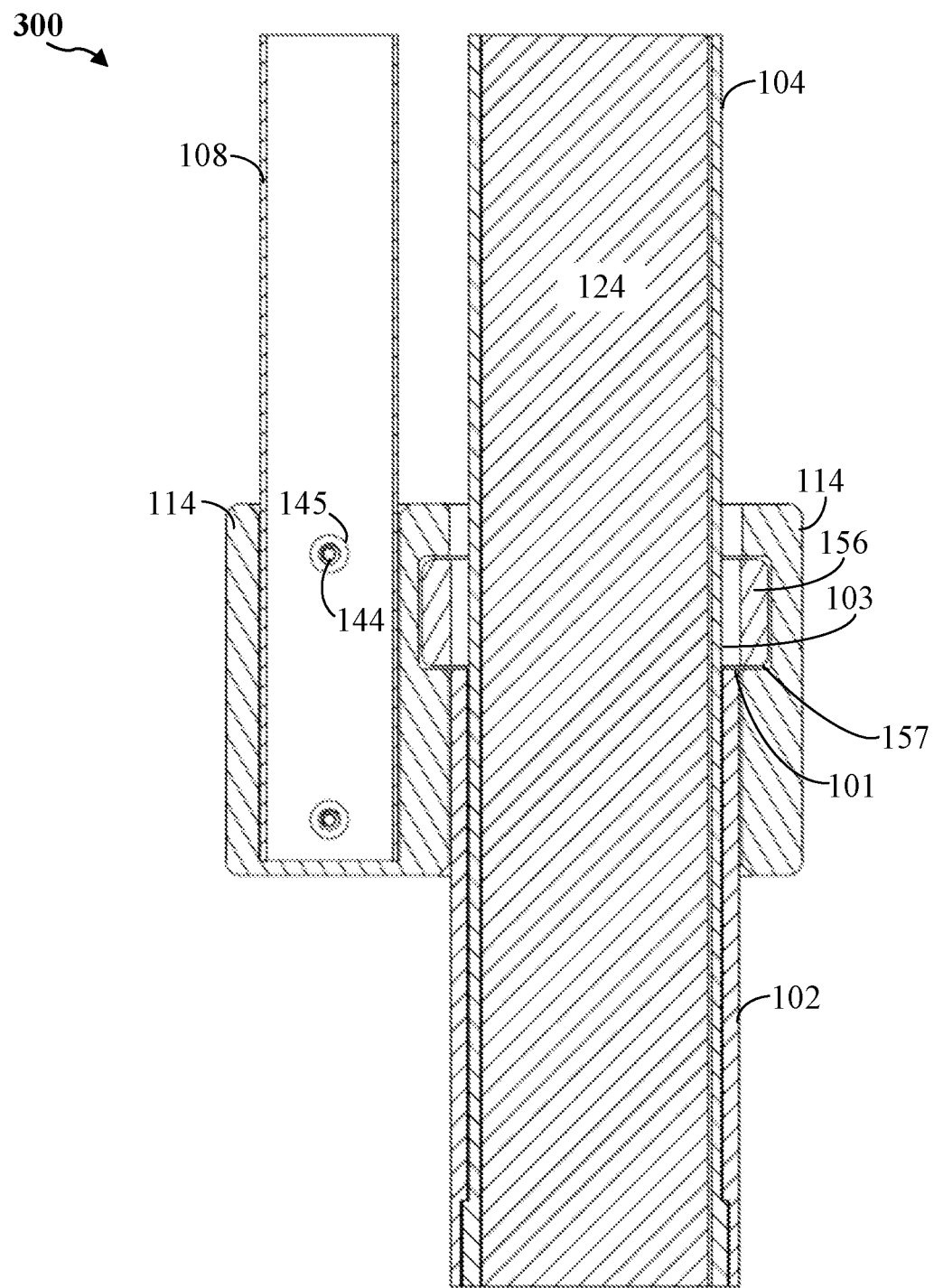
FIG. 3D is a sectional view of the middle section of the outrigger assembly in FIG. 3A, taken along line C-C of FIG. 3A, according to an embodiment of the present invention.
Figure 3E:
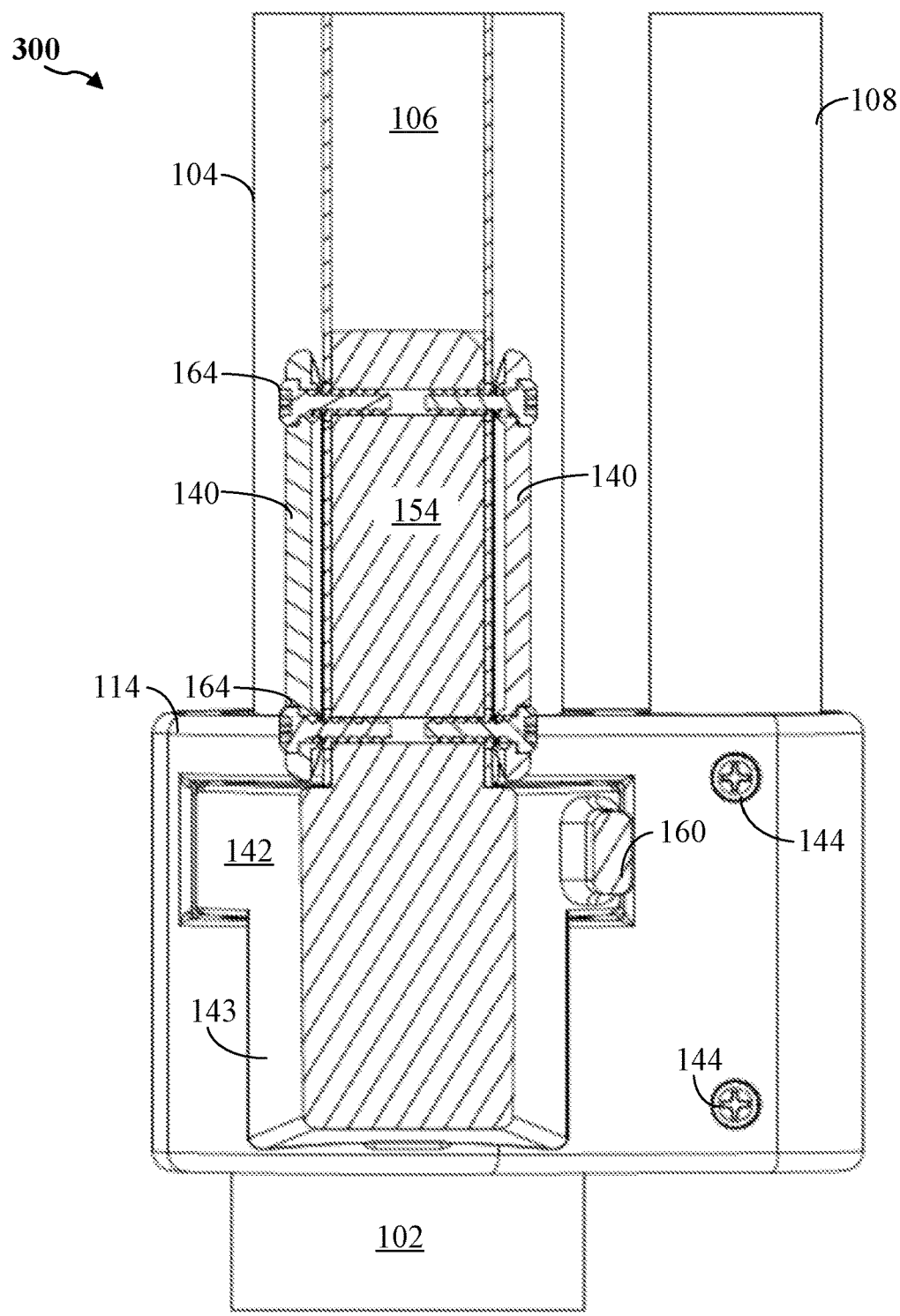
FIG. 3E is a sectional view of the middle section of the outrigger assembly in FIG. 3A, taken along line D-D of FIG. 3A, according to an embodiment of the present invention.
Figure 4A:
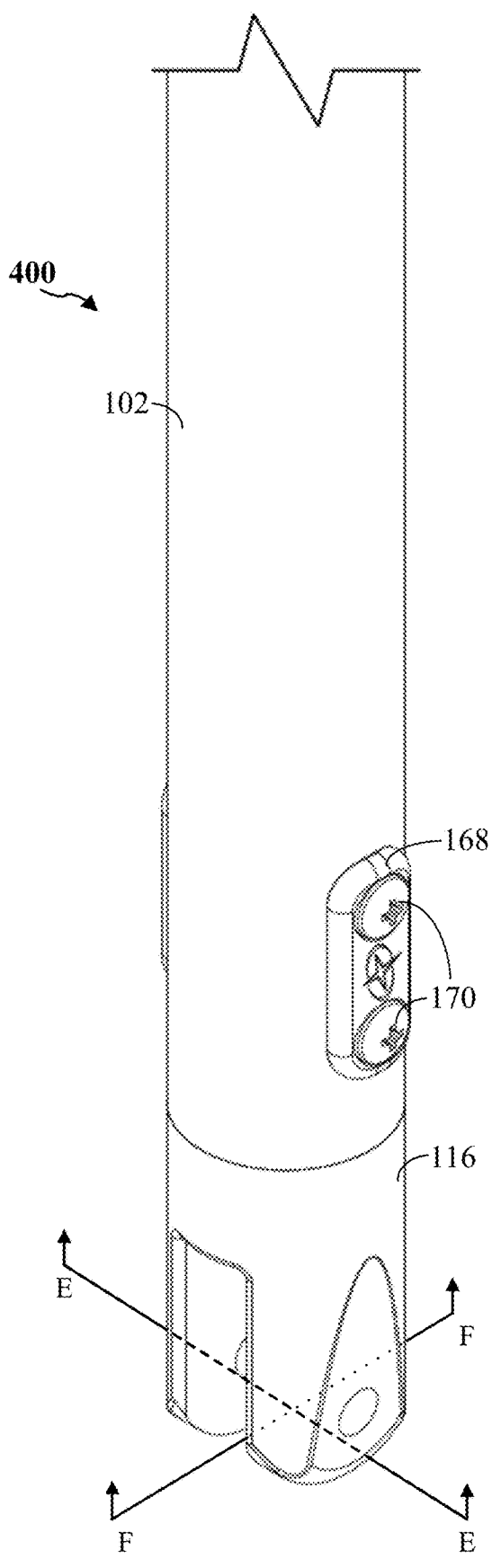
FIG. 4A is a perspective view of a proximal end of the outrigger assembly of FIGS. 1A-1B, according to an embodiment of the present invention.
Figure 4B:
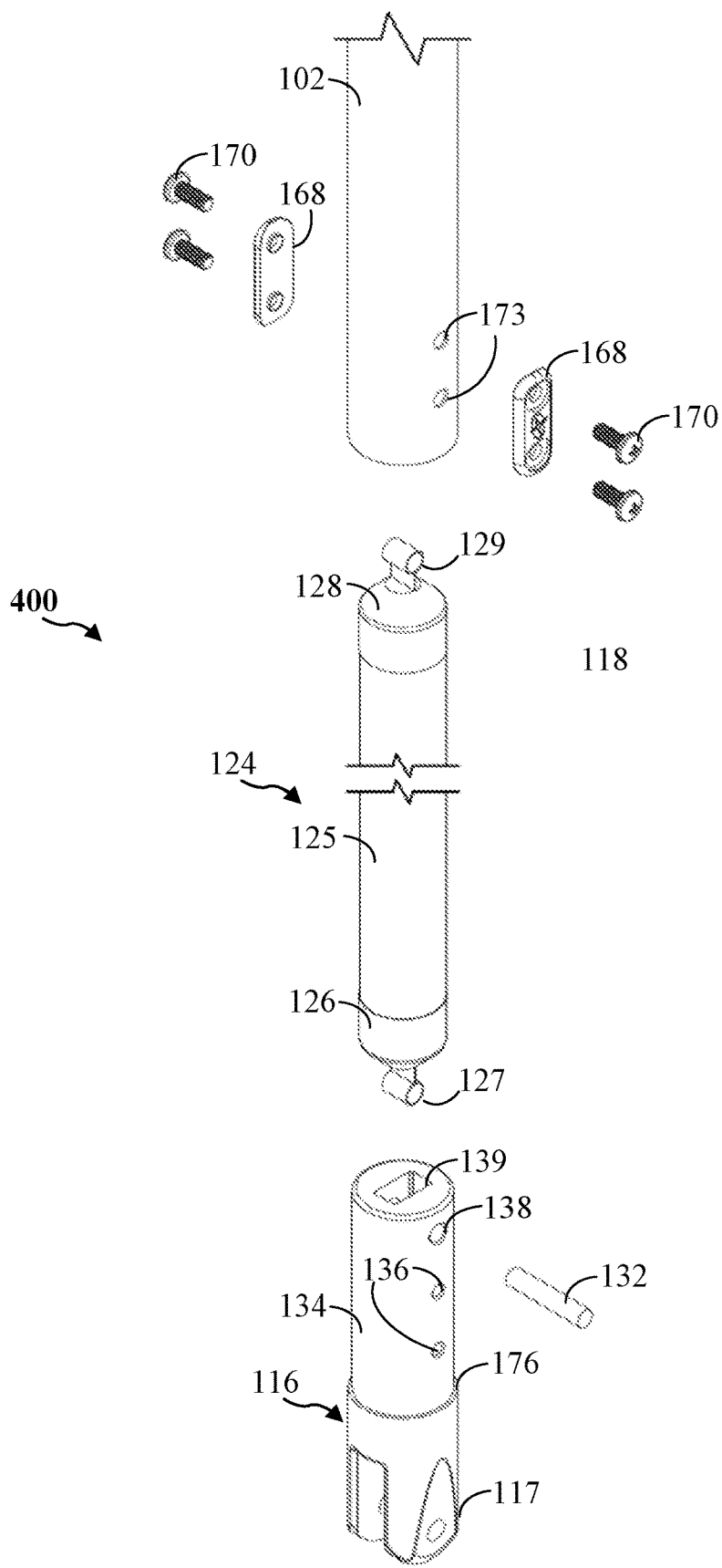
FIG. 4B is an exploded view of the proximal end of the outrigger assembly in FIG. 4A, according to an embodiment of the present invention.
Figure 4C:
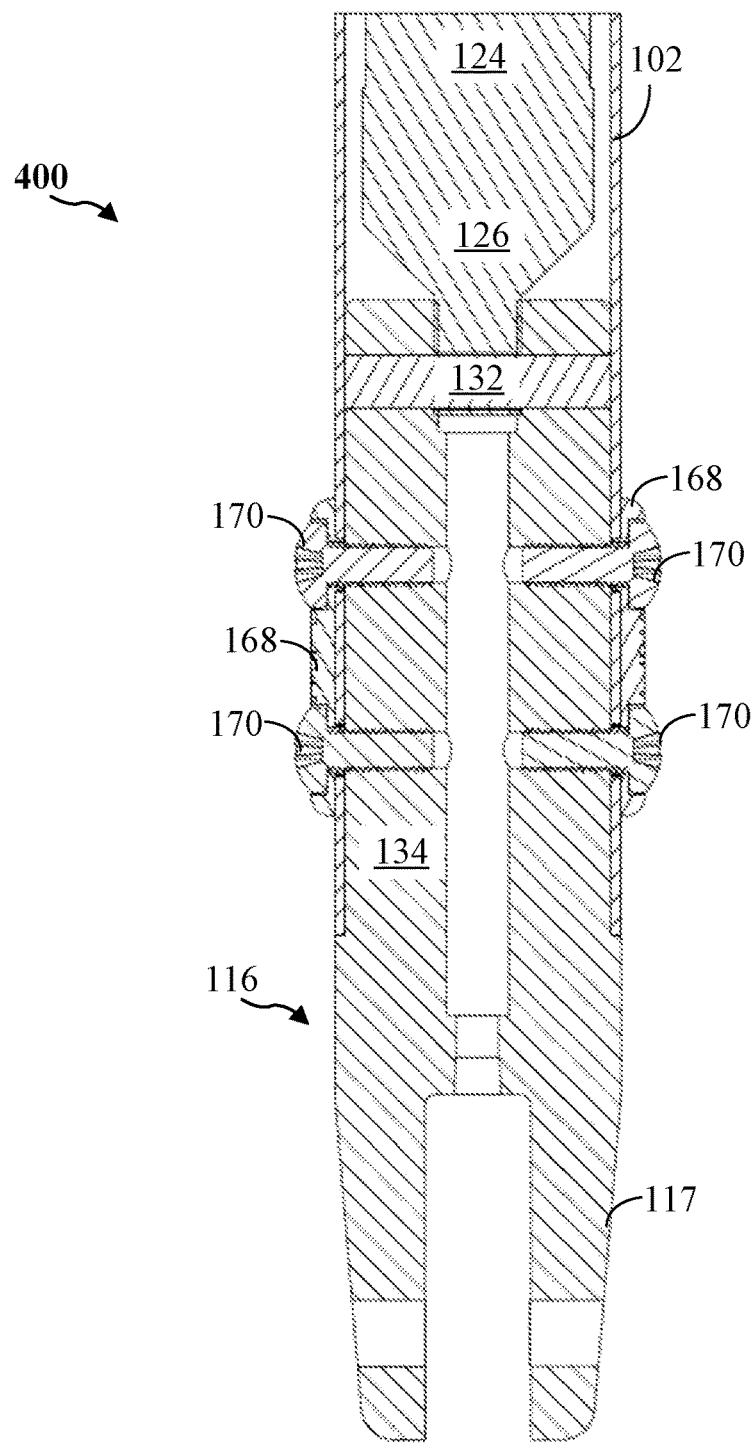
FIG. 4C is a sectional view of the proximal end of the outrigger assembly in FIG. 4A, taken along line E-E of FIG. 4A, according to an embodiment of the present invention.
Figure 4D:
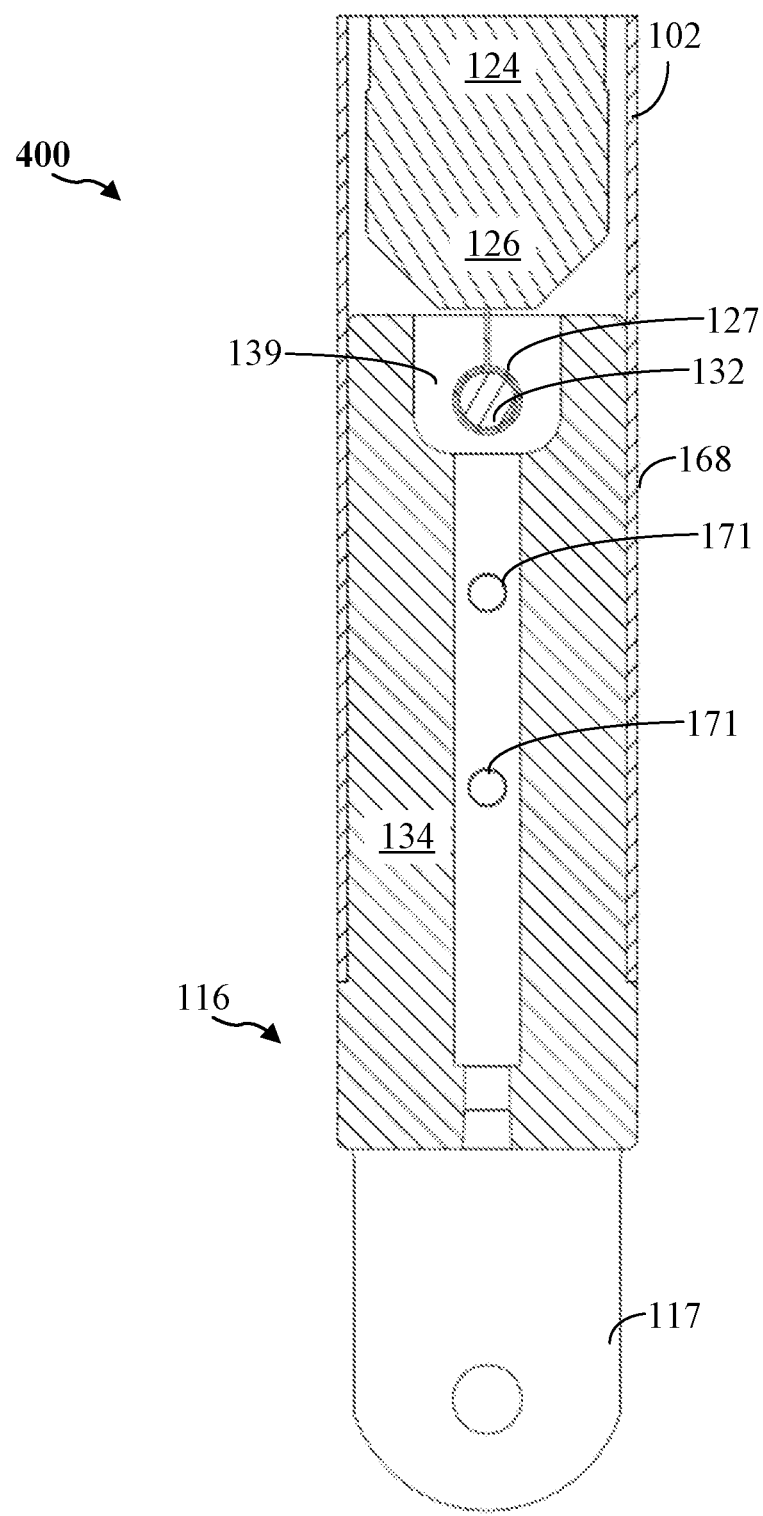
FIG. 4D is a sectional view of the proximal end of the outrigger assembly in FIG. 4A, taken along line F-F of FIG. 4A, according to an embodiment of the present invention.

Referring to FIGS. 3A-3E, the middle section 300 of the outrigger assembly 100 is shown. One disadvantage of known telescoping designs is the lack of ability to mechanically lock the telescoped tubes into a fully extended position and the ability to remotely unlock or release a locking mechanism. Accordingly, embodiments of the present invention provide the ability to lock the telescoping tubes 102, 104 into the fully extended position immediately upon reaching full extension, but also the ability to remotely unlock the outrigger assembly 100 via, for example, a light pull on a cord that is attached to the cantilever spring assembly 106. Embodiments of the present invention achieve this using the cantilever spring assembly 106. The middle section 300 may feature the engagement of the cantilever spring assembly 106 with the stabilizer base 114, first telescoping tube 102 and second telescoping tube 104. FIG. 3B depicts an exploded view of the stabilizer base 114. FIG. 3C depicts an exploded view of the cantilever spring assembly 106. FIG. 3D is a sectional view of the middle section 300 taken across line C-C when the outrigger assembly 100 is fully extended. FIG. 3E is a sectional view of the middle section 300 taken across line D-D.

As shown in FIG. 3B, the stabilizer base 114 may define a void 146 for receiving the stabilizer pole 108 as well as one or more voids 147 for receiving screws 144. The stabilizer pole may define one or more voids 145 for receiving corresponding screws 144 through adapted to secure the stabilizer pole to the stabilizer base 114. The stabilizer tube 108 may be a rigid tube positioned on a parallel axis offset from the central axis of the telescoping tubes 102, 104. Because the stabilizer tube 108 is rigidly fixed to the stabilizing base 114 and to the endcap 110, the stabilizer tube 108 may prevent twisting of the cantilever spring assembly 106 and ensure reliable action of the cantilever spring assembly 106 and its locking ability.

The stabilizer base 114 includes or defines an axial passthrough 148 through which the first telescoping tube 102 and the second telescoping tube 104 may pass as the outrigger assembly 100 is extended and retracted. As shown in FIG. 3C, the stabilizer base 114 may define a groove 141 defined on the outer surface of the stabilizer base 114 adapted to receive and retain the cantilever base 142. The stabilizer base 114 may also define a slot 152 in the stabilizer base 114 to receive a cantilever spring ring 156 of the cantilever spring assembly 106. One or more retaining pins 150 may be disposed within corresponding upper voids 151 and lower voids 153 (FIG. 3B) defined in the stabilizer base 114. According to an embodiment, upper voids 151 may be defined on a top surface of the stabilizer base 114, while lower voids 153 may be defined on a lower surface defining the slot 152 that receives the cantilever spring ring 156. The retaining pins 150, as explained below, may pass through an axial passthrough 158 of the cantilever spring ring 156 when the cantilever spring ring 156 is disposed within the slot 152. The retaining pins 150 aid in preventing the cantilever spring assembly 106 from disengaging with the stabilizer base 114.

According to an embodiment, as shown in the exploded view of FIG. 3C, the cantilever spring assembly 106 may include a stanchion 105, fixture plates 140, and a cantilever base 142. In an embodiment, the stanchion 105 may be a carbon fiber tube. As detailed herein the stanchion 105 may be rigidly fixed to the second telescoping tube 104 through the endcap 110. The stanchion 105 may include or define voids 165 for receiving screws 164 adapted to couple the stanchion 105 to the cantilever base 142. The cantilever base 142 may include a shank 154 extending from the cantilever base 142. The shank 154 may include or define voids 166 for receiving screws 164 adapted to couple the shank 154 to the stanchion 105. The shank 154 may be sized just smaller than the internal diameter of the stanchion 105 to provide a secure coupling to the cantilever base 142. The cantilever base 142 may include a band 160 extending from the cantilever base 142 defining a loop 162. The loop 162 may be use as an attachment point for a rope, pulley, or other device to aid in extending or retracting the outrigger assembly 100. The cantilever base 142 may further include or define a support 143. The support 143 may include a projection (not shown) sized and shaped to securely couple the groove 141 of the stabilizer base 114.

The cantilever spring assembly 106 may be coupled to the outrigger assembly 100 in a way that the stanchion 105 is parallel to the telescoping tubes on one plane, but on a plane perpendicular to that parallel plane, it is biased inwardly towards the central axis of the telescoping tubes 102, 104, as shown in FIG. 2E. According on an embodiment, the stanchion 105 may be coupled to the endcap 100 at an inward angle such that the distance between the stanchion 105 and the second telescoping tube 104 decreases between the endcap 110 to the stabilizer base 114. Conceptually, this is shown in FIG. 2E as the distance X is greater than the distance Y. The cantilever spring ring 156 may have an internal diameter that is slightly greater than the outer diameter of the second telescoping tube 104, thus allowing a telescoping relationship. In an embodiment, the spring ring is rigid and has lateral travel such that the inward bias slides the spring ring over the top of the wider tube after passing over the top. Pulling the spring ring back and down then slides the ring down over the wider tube. As such, the cantilever spring ring 156 may slide laterally within the slot 152 of the stabilizer base 114 to contact the telescoping tubes 102, 104. The contact force of the cantilever spring ring 156 with the first telescoping tube 102 due to the inward bias of the cantilever spring assembly 106 may provide a spring preload which is the force that snaps the cantilever spring ring 156 and stanchion 105 into a locked or braced position when the cantilever spring ring 156 passes over an end 101 of the first telescoping tube 102.

According to an embodiment, as shown in FIG. 3D, the cantilever spring assembly 106 may be just short enough such that as the outrigger assembly 100 is extended the cantilever spring ring 156 automatically slips over the end 101 of the first telescoping tube 102 and a bottom surface 157 of the spring ring 156 engages top surface 101 of the first telescoping tube 102. The spring ring 156 may further engage the outer surface 103 of the second telescoping tube 104 due the inward bias of the cantilever spring assembly 106. In this position, the cantilever spring ring 156, which may be very stiff in compression, prevents the retracting of the second telescoping tube 104 because the cantilever spring ring 156 cannot be compressed or otherwise deformed and the stanchion 105 acts as a rigid brace. In an embodiment, to unlock the assembly, a force such as a pull on a cord attached to the loop 162, for example, may slide the cantilever base 142 back and deflect the cantilever spring ring 156 so that it can pass over the outer surface of the first telescoping tube 102 and release the bracing effect of the stanchion 105.

Referring to FIGS. 4A-4D, the proximal end 400 of the outrigger assembly 100, including the first telescoping tube 102, the proximal mounting body 116, fixture plates 168, and screws 170. The proximal end 400 of the outrigger assembly 100 is adapted to couple the assembly to a support, additional rigging, or other structures. The proximal mounting body 116 may be substantially similar to the distal mounting body 112 and may include a clevis 117 and a reduced-diameter portion 134. The proximal mounting body 116 may include or define one or more voids 136 to receive screws 170 adapted to couple the fixture plates 168 and proximal mounting body 116 to the first telescoping tube 102. The proximal mounting body 116 may include or define a recess 139 sized to receive the coupling ring 127 of the internal bias member 124. The proximal mounting body 116 may also include a void 138 for receiving a retaining pin 132 adapted to couple the proximal end 126 of the internal bias member 124 via the coupling ring 127.

In assembly, the coupling ring 127 of the internal bias member 124 may be disposed in the recess 139 and the retaining pin 132 may be inserted through void 138 and coupling ring 127. The first telescoping tube 102 may be disposed over the internal bias member 124 and the reduced diameter portion 134 of the proximal mounting body 116. The first telescoping tube 102 may engage a flange 176 preventing the first telescoping tube from sliding beyond the proximal mounting body 116. The voids 136 of the proximal mounting body 116 may align with voids 173 of the first telescoping tube 102 allowing the screws 170 to securely couple, through the fixture plates 168, the proximal mounting body 116 to the first telescoping tube 102. According to an embodiment, the outer diameter of the proximal mounting body 116 is substantially the same as the outer diameter of the first telescoping tube 102.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A telescoping arm assembly, comprising:
   first and second tubes in sliding engagement, the first tube having an internal diameter greater than an external diameter of the second tube;
   an endcap coupled to the second tube;
   a cantilever spring assembly coupled to the endcap on an inward bias towards a central axis of the first and second tubes, the cantilever spring assembly including a spring ring defining a first axial passthrough, the spring ring slidingly coupled to the first tube through the first axial passthrough; and
   a stabilizer base defining a second axial passthrough and slidingly coupled to the first and second tubes through the second axial passthrough;
   wherein the inward bias of the cantilever spring assembly biases the spring ring laterally towards the central axis as the spring ring axially slides over a top surface of the first tube.

2. The telescoping arm assembly of claim 1, further comprising an internal bias member coupled to the first and second tubes, the internal bias member having a length less than a length of the first tube.

3. The telescoping arm assembly of claim 2, wherein the internal bias member includes a non-metallic spring.

4. The telescoping arm assembly of claim 2, wherein the internal bias member includes a sheath.

5. The telescoping arm assembly of claim 4, wherein the sheath includes a positive stop limiting the travel of the second tube.

6. The telescoping arm assembly of claim 2, wherein the internal bias member includes a first spring having a first spring rate and a second spring coupled the first spring, the second spring having a second spring rate less than the first spring rate.

7. The telescoping arm assembly of claim 1, further comprising a stabilizer tube coupled to the endcap and the stabilizer base.

8. The telescoping arm assembly of claim 7, wherein the stabilizer tube is disposed on an offset axis substantially parallel to the central axis.

9. The telescoping arm assembly of claim 1, wherein the cantilever spring assembly further includes a cantilever base forming the spring ring; and a stanchion coupled to the cantilever base and the endcap.

10. The telescoping arm assembly of claim 9, wherein the cantilever base further includes a shank, and wherein the stanchion is coupled to the shank.

11. The telescoping arm assembly of claim 9, wherein the stanchion is a carbon-fiber tube.

12. The telescoping arm assembly of claim 9, wherein the stanchion is coupled to the endcap at an offset angle forming the inward bias of the cantilever spring assembly.

13. The telescoping arm assembly of claim 1, wherein the stabilizer base defines a slot, and wherein the spring ring is disposed through the slot.

14. The telescoping arm assembly of claim 13, further comprising a retaining pin coupled to the stabilizer base and disposed axially through the slot and the second axial passthrough of the spring ring.

15. The telescoping arm assembly of claim 1, wherein the stabilizer base defines a groove that is coupled to a support on the cantilever base.

16. The telescoping arm assembly of claim 1, further comprising a mounting body.

17. The telescoping arm assembly of claim 16, wherein the mounting body includes a clevis.

18. The telescoping arm assembly of claim 1, wherein the first and second tubes form a pneumatic seal from the sliding engagement.

19. A telescoping outrigger, comprising:
   first and second tubes in sliding engagement, the first tube having an internal diameter substantially equal to the external diameter of the second tube;
   a first mounting body coupled to the first tube and a second mounting body coupled to the second tube;
   an endcap coupled to the second tube and the second mounting body;
   a cantilever spring assembly coupled to the endcap on an inward bias towards a central axis of the first and second tubes, the cantilever spring assembly including a spring ring defining a first axial passthrough, the spring ring slidingly coupled to the first tube and second tube through the first axial passthrough,
   a stabilizer base defining a second axial passthrough, the stabilizer base coupled to the cantilever spring assembly, the first and second telescoping tubes coupled to the stabilizer base through the second axial passthrough;
   a stabilizer tube coupled to the end cap and the stabilizer base; and
   an internal bias member coupled to the first and second mounting bodies and disposed within the first and second tubes;

wherein the inward bias of the cantilever spring assembly pushes the spring ring laterally towards the central axis as the spring ring axially slides over a top surface of the first tube, engaging a bottom surface of the spring ring with the top surface of the first tube.

* * * * *